Aug. 16, 1927.

L. S. WILLIAMSON ET AL 1,638,901

ADJUSTABLE AWNING FRAME FOR MOTOR VEHICLES

Filed Aug. 17, 1926

L. S. Williamson,
Bert A. DeBord,
INVENTOR.

BY John M. Spellman,
ATTORNEY.

Patented Aug. 16, 1927.

1,638,901

UNITED STATES PATENT OFFICE.

LOUIS S. WILLIAMSON AND BERT A. DE BORD, OF TEMPLE, TEXAS.

ADJUSTABLE AWNING FRAME FOR MOTOR VEHICLES.

Application filed August 17, 1926. Serial No. 129,855.

This invention relates to improvements in shades for windows, more particularly for motor vehicles of the closed body type and one of the objects of the invention is to provide a shade or awning for the upper part of the vehicle door which forms a window, to shield the occupants from rain or sun when the glass in the window is lowered.

Another particular object of the invention is that the framework which forms a means for holding the canvas or other covering may be adjusted to varied angles.

Still another particular feature of the invention is that the entire shade and its frame may be readily removed from the window, folded and placed out of the way.

With the above and further minor yet important objects in view the invention will be clearly understood from a perusal of the following detailed description, taken in connection with the accompanying drawings forming part hereof and in which—

Figures 3, 5:
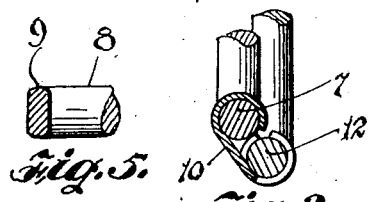
Figure 4:
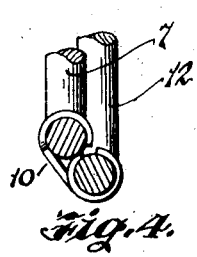

Figures 3, 4 and 5 are detail sectional views along the lines 3—3, 4—4, and 5—5.

Figure 1:
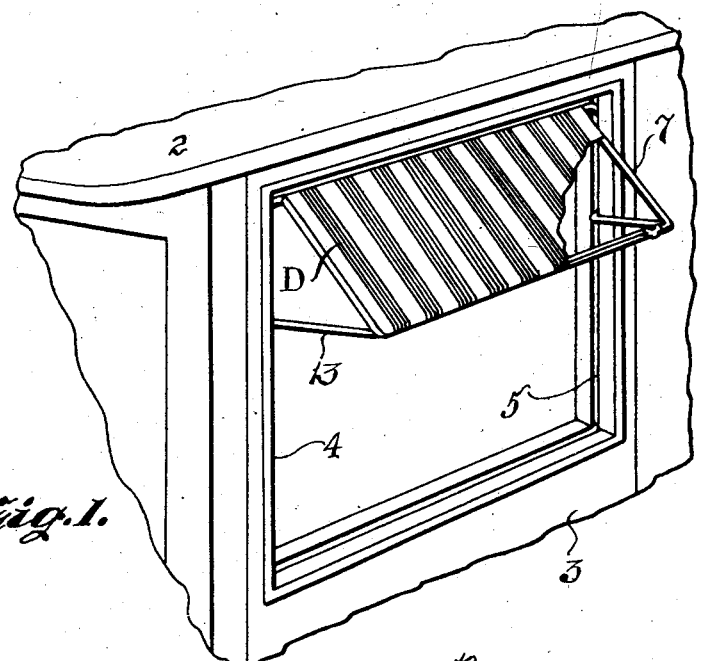
Figure 1 is a perspective view of a motor vehicle window illustrating an embodiment of the awning or shade.

Having a more detailed reference to the drawings, wherein similar numerals indicate the various parts, Figure 1 represents a portion of a motor vehicle with top 2 and front door 3. In motor vehicles of the closed body type, the door includes a window including a frame 4 and provided with a groove 5 in which the window glass slides in opening and closing the window.

In driving the vehicle a shade or awning is very desirable to protect the occupants from the sun or weather conditions on either side of the vehicle, particularly that side on which the steering wheel is situated.

The present invention comprises a framework which consists of a single rod of spring steel 7 bent at the points A to form substantially an oblong outline. The rod when thus bent forms a loop with the free ends 8 extended beyond the loop, flattened and turned at right angles as at 9. The tips 9 bear against the bottom and side of the groove or channel, referred to more fully hereinafter. Clamp members 10 hold the paralleled or doubled portions together yet permit these doubled parts to move laterally over each other so that the tips 9 can be moved inwardly or outwardly in placing the frame in position in the window.

Attached to the opposite side of the frame by clamp members 10 is a rod 12 including free end portions 13 also bent at B and C to form the tips 14 to engage in the groove 5. The clamp members 10 in this application hold the parts tightly together, but permit the rod 12 to swing freely in hinge fashion to properly adjust the awning. The end portions 13 are bent outwardly so that when in use there will be an outward pressure thereof against the window frame to maintain the rod 12 in place.

A covering D is stitched or otherwise secured to the frame.

Figure 2:
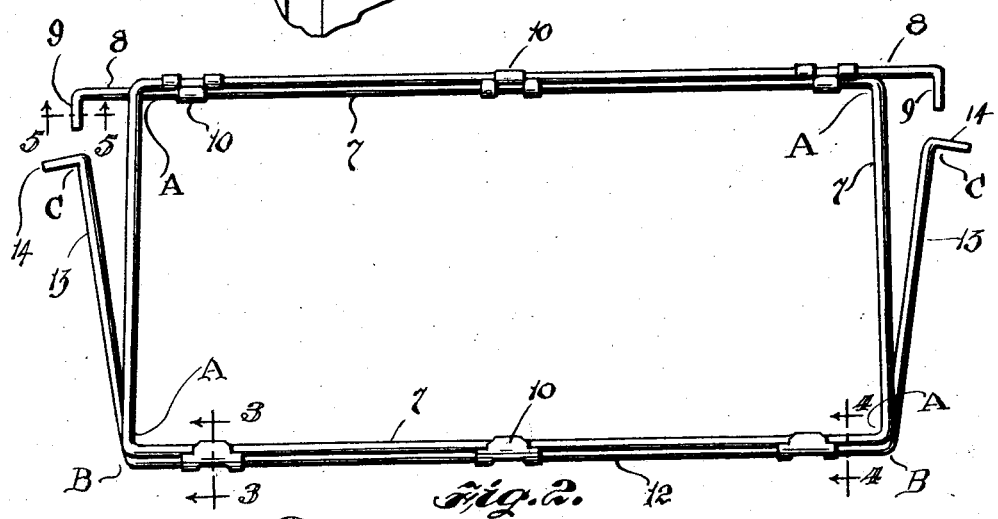
Figure 2 is a top plan view of the frame, the covering removed.

From the foregoing it will now be apparent that the awning, or shade may be easily adjusted by slight movement of the frame or rod 12. The construction is such that a normal upward pressure of the parts 13 of rod 12 will cause the tips 9 to grip the side wall of the groove 5. This will be obvious from an inspection of Figures 1 and 2, since the upward movement of the lower end of the frame will permit the upper ends of the rods to move or rotate in the clamps and the end portions 7 and 8 will be slightly twisted or sprung to cause the tips 9 to bear against the side wall of the groove 5. Should further upward pressure be brought on the legs or parts 13 of the lower rod 12 the result will be a tighter gripping effect of the tips 9.

When not in use the entire device may be removed from the window and placed in a convenient out of the way place in the vehicle.

It should be understood, however, that the rods constituting the framework may be joined together otherwise than by the clamp members such as by twisting, looping or in any manner to provide a secure connection of the framework. Also if preferred the free ends of the rods may include rubber tips or other non-abrasive elements.

What is claimed is:

1. An awning for motor vehicles comprising a rectangular frame, a covering therefor, said frame formed from a single resilient rod, said rod doubled at one side of the frame with the two end portions of the rod lying next and paralleling one another and extending beyond the plane of the frame, the extreme ends of the rod bent to form lugs; said paralleled portions including clamp members to hold the parts together and to permit the end portions lateral movement; said paralleled portions constituting the upper side of the frame when the frame is in position; and a rod formed of U-shape pivotally clamped to the lower side of the frame, said U-shaped rod forming various angles with the rectangular frame when in use.

2. An awning for motor vehicles as set out in claim 6 and wherein said U-shaped rod has each end outwardly directed and includes lugs to engage the motor vehicle window groove.

3. An awning for motor vehicles as set out in claim 6 and wherein the lugs of said rod in the paralleled part of the frame and the lugs of the rod pivotally attached to the lower part of the frame lie in the groove of the motor vehicle window, said U-shape rod having its end portions sprung outwardly to provide a pressure of its lugs against the window groove when the awning and frame is in position.

4. An awning for motor vehicles as set out in claim 6 and wherein the lugs of said rod of the upper part of the frame where same is paralleled bear against the side wall of the groove and grip the side wall of said groove when the lower part of the frame is moved upward by said U-shaped rod, said end portions or legs of the rod which is U-shaped holding the frame in an adjustable position on an incline.

5. An awning for motor vehicles comprising a rectangular frame, said frame comprising a rod bent upon itself, the two end portions thereof lying next and paralleling each other, the extreme ends of the rods forming lug-engaging parts for the window grooves when the frame is in inclined position; clamp members for holding said paralleled portions together; said clamp members permitting the ends of the rods to slide one on the other outwardly and inwardly to adjust the frame in position to the window.

In testimony whereof we affix our signatures.

LOUIS S. WILLIAMSON.
BERT A. DE BORD.